United States Patent
Sun et al.

(10) Patent No.: US 11,882,297 B2
(45) Date of Patent: Jan. 23, 2024

(54) IMAGE RENDERING AND CODING METHOD AND RELATED APPARATUS

(71) Applicant: Huawei Technologies Co., Ltd., Shenzhen (CN)

(72) Inventors: Nanyong Sun, Hangzhou (CN); Fengjuan Wang, Shenzhen (CN); Xinghua Xie, Hangzhou (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 216 days.

(21) Appl. No.: 17/572,067

(22) Filed: Jan. 10, 2022

(65) Prior Publication Data

US 2022/0132147 A1 Apr. 28, 2022

Related U.S. Application Data

(63) Continuation of application No. PCT/CN2020/095529, filed on Jun. 11, 2020.

(30) Foreign Application Priority Data

Sep. 26, 2019 (CN) .................... 201910919459.4

(51) Int. Cl.
*H04N 19/186* (2014.01)
*H04N 19/423* (2014.01)
*H04N 21/2343* (2011.01)

(52) U.S. Cl.
CPC ......... *H04N 19/186* (2014.11); *H04N 19/423* (2014.11); *H04N 21/234309* (2013.01)

(58) Field of Classification Search
CPC .................... H04N 19/186; H04N 19/423
(Continued)

(56) References Cited

U.S. PATENT DOCUMENTS

| 10,168,879 B1 | 1/2019 | Duan et al. |
| 2008/0143739 A1 | 6/2008 | Harris et al. |

(Continued)

FOREIGN PATENT DOCUMENTS

| CN | 105163127 A | 12/2015 |
| CN | 105678680 A | 6/2016 |

(Continued)

OTHER PUBLICATIONS

Pablo Montero et al "Parallel Zigzag Scanning and Huffman Coding for a GPU-based MPEG-2 Encoder," IEEE International Symposium On Multimedia (ISM), IEEE, Piscataway, NJ, USA, Dec. 13, 2010, 8 pages.

(Continued)

*Primary Examiner* — Nguyen T Truong
(74) *Attorney, Agent, or Firm* — Conley Rose, P.C.

(57) ABSTRACT

An image rendering and coding method includes first sending, by a first processor, to-be-rendered data to a second processor; instructing the second processor to obtain first format data through rendering based on the to-be-rendered data, where the first format data is in first storage space of the second processor; instructing, by the first processor, the second processor to convert the first format data into second format data; and instructing the second processor to code the second format data into third format data, where a first data capacity of the third format data is less than a second data capacity of the second format data; and sending the third format data to a client.

19 Claims, 5 Drawing Sheets

(58) Field of Classification Search
USPC .................................................. 375/240.01
See application file for complete search history.

(56) References Cited

U.S. PATENT DOCUMENTS

2016/0132284 A1  5/2016  Amara Venkata et al.
2018/0035125 A1  2/2018  Lee et al.

FOREIGN PATENT DOCUMENTS

CN  107729095 A  2/2018
CN  110636305 A  12/2019

OTHER PUBLICATIONS

ITU-T H.264, Jun. 2019, "Series H: Audiovisual and Multimedia Systems; Infrastructure of audiovisual services, Coding of moving video, Advanced video coding for generic audiovisual services," 836 pages.

ITU-T H.265, Jun. 2019, "Series H: Audiovisual and Multimedia Systems, Infrastructure of audiovisual services, Coding of moving video; High efficiency video coding," 696 pages.

IMAGE RENDERING AND CODING METHOD AND RELATED APPARATUS

CROSS-REFERENCE TO RELATED APPLICATIONS

This is a continuation of International Patent Application No. PCT/CN2020/095529 filed on Jun. 11, 2020, which claims priority to Chinese Patent Application No. 201910919459.4 filed on Sep. 26, 2019. The disclosures of the aforementioned applications are hereby incorporated by reference in their entireties.

TECHNICAL FIELD

The present disclosure relates to the field of image data processing technologies, and in particular, to an image rendering and coding method and a related apparatus.

BACKGROUND

In a cloud service environment, a service or a program runs on a server side to perform a key or complex operation, and transmits a result of the operation to a remote client, and the remote client is responsible for receiving the result of the server side. In a mobile phone cloud game scenario, a server renders and codes each frame of image, and then sends frame data obtained through rendering and coding to a remote client through a network. The remote client receives the frame data of a cloud server side, and then decodes the frame data for display. On the server side, a game image is rendered by using a graphics processing unit (GPU), and a rendered image is image data in an RGBA format (RGBA is color space representing red, green, blue, and alpha). A data size of a typical 720 pixels (p) image is approximately 28 mega (M) bits. Such a large data volume is quite difficult to process in a case of limited network bandwidth. Therefore, H.264 or H.265 video coding and compression need to be performed on an image stream before network transmission, to reduce network bandwidth.

Specific implementation of a data rendering and coding procedure in an existing solution may be shown in FIG. 1. In FIG. 1, after completing a rendering operation, a GPU needs to replicate rendered image data in an RGBA format to a central processing unit (CPU). The CPU converts the image data in the RGBA format to frame data in a luma, blue projection, and red projection (YUV) format, and then the CPU replicates the frame data in the YUV format to video memory space of the GPU. Then the GPU performs H264 or H265 coding. In this process, data obtained after the rendering operation needs to be transmitted between the CPU and the GPU twice, that is, in step 3 and step 5 in FIG. 1. Consequently, additional CPU and GPU resources are consumed, performance is degraded, and coding and rendering efficiency are reduced.

In conclusion, how to reduce CPU and GPU resources and improve efficiency in an image rendering and coding process is a technical problem that needs to be resolved by a person skilled in the art.

SUMMARY

Embodiments of this application disclose an image rendering and coding method and a related apparatus, so that resources of a processor can be reduced, and rendering and coding efficiency can be improved.

According to a first aspect, an embodiment of this application discloses an image rendering and coding method. The method includes the following.

A first processor sends to-be-rendered data to a second processor.

The first processor indicates the second processor to obtain first format data through rendering based on the to-be-rendered data. The first format data includes a three-primary-color color feature of an image, and the first format data is stored in first storage space of the second processor.

The first processor indicates the second processor to convert the first format data into second format data. The second format data includes a luminance value and a chrominance value of the image.

The first processor indicates the second processor to code the second format data into third format data. A data capacity of the third format data is less than a data capacity of the second format data.

The first processor sends the third format data to a client.

The first processor may be a central processing unit CPU, a microprocessor with a non-interlocking pipeline phase architecture, an advanced reduced instruction set machine, a field-programmable gate array (FPGA), or the like. The second processor may be a GPU or another apparatus or device that can complete graphics processing, for example, an artificial intelligence accelerator card.

In comparison with a current technology in which data in a first format that is rendered in a second processor needs to be replicated to a memory of a first processor, the data is converted into data in a second format in the first processor, and then the data in the second format is replicated to a memory of the second processor for coding, in this embodiment of this application, a process of performing rendering, format conversion, and coding may be completed in the second processor without requiring additional two times of data transmission. Therefore, in this embodiment of this application, resources of the processor can be reduced, and rendering and coding efficiency can be improved.

In a possible implementation, after the first processor indicates the second processor to obtain the first format data through rendering based on the to-be-rendered data, before the first processor indicates the second processor to convert the first format data into the second format data, the method further includes the following.

The first processor invokes a first interface to obtain a storage address of the first format data in the first storage space.

The first processor invokes the first interface to send the storage address to a second interface.

The first processor invokes the second interface to indicate the second processor to mark the storage address in a to-be-coded area. The to-be-coded area includes storage space used to store to-be-coded data and/or a storage address of the to-be-coded data.

In this embodiment of this application, rendered image data may be obtained by using a dedicated application programming interface, so that format conversion can be performed on the image data on a second processor side, thereby avoiding operations of replicating rendered data to the first processor for format conversion and then replicating data obtained through format conversion to the second processor, and reducing resources of the first processor and the second processor.

In a possible implementation, the first interface is an application programming interface that is configured in a graphics library and that is used to obtain the storage address.

In a possible implementation, the second interface is an application programming interface that is configured in a video acceleration library and that is used to receive the storage address sent by the first interface and indicate the second processor to mark the storage address in the to-be-coded area.

In a possible implementation, the first processor invokes a third interface to apply to the second processor for second storage space, where the second storage space is address space used to store the second format data, and the third interface is an application programming interface in the video acceleration library, and the first processor invokes the third interface to indicate the second processor to convert the first format data into the second format data.

In a possible implementation, that the first processor indicates the second processor to code the second format data into third format data includes the following.

The first processor invokes a fourth interface to apply to the second processor for third storage space. The third storage space is address space used to store the third format data, and the fourth interface is an application programming interface in the video acceleration library.

The first processor invokes the fourth interface to indicate the second processor to code the second format data into the third format data.

According to a second aspect, an embodiment of this application discloses an image rendering and coding method. The method is used for a processor, and the method includes receiving to-be-rendered data, obtaining first format data through rendering based on the to-be-rendered data, where the first format data includes a three-primary-color color feature of an image, and the first format data is stored in first storage space of the processor, converting the first format data into second format data, where the second format data includes a luminance value and a chrominance value of the image, coding the second format data into third format data, where a data capacity of the third format data is less than a data capacity of the second format data, and sending the third format data.

According to a third aspect, an embodiment of this application discloses a processor. The processor is configured to sending to-be-rendered data to a second processor, indicating the second processor to obtain first format data through rendering based on the to-be-rendered data, where the first format data includes a three-primary-color color feature of an image, and the first format data is stored in first storage space of the second processor, indicating the second processor to convert the first format data into second format data, where the second format data includes a luminance value and a chrominance value of the image, indicating the second processor to code the second format data into third format data, where a data capacity of the third format data is less than a data capacity of the second format data, and sending the third format data to a client.

In a possible implementation, after the processor indicates the second processor to obtain the first format data through rendering based on the to-be-rendered data, before the processor indicates the second processor to convert the first format data into the second format data, the processor invokes a first interface to obtain a storage address of the first format data in the first storage space, the processor invokes the first interface to send the storage address to a second interface, the processor invokes the second interface to indicate the second processor to mark the storage address in a to-be-coded area, where the to-be-coded area includes storage space used to store to-be-coded data and/or a storage address of the to-be-coded data.

In a possible implementation, the first interface is an application programming interface that is configured in a graphics library and that is used to obtain the storage address.

In a possible implementation, the second interface is an application programming interface that is configured in a video acceleration library and that is used to receive the storage address sent by the first interface and indicate the second processor to mark the storage address in the to-be-coded area.

In a possible implementation, that the processor indicates the second processor to convert the first format data into second format data includes The processor invokes a third interface to apply to the second processor for second storage space. The second storage space is address space used to store the second format data, and the third interface is an application programming interface in the video acceleration library.

The processor invokes the third interface to indicate the second processor to convert the first format data into the second format data.

In a possible implementation, that the processor indicates the second processor to code the second format data into third format data includes the following.

The processor invokes a fourth interface to apply to the second processor for third storage space. The third storage space is address space used to store the third format data, and the fourth interface is an application programming interface in the video acceleration library.

The processor invokes the fourth interface to indicate the second processor to code the second format data into the third format data.

According to a fourth aspect, an embodiment of this application discloses a processor. The processor performs the following operations: receiving to-be-rendered data, obtaining first format data through rendering based on the to-be-rendered data, where the first format data includes a three-primary-color color feature of an image, and the first format data is stored in first storage space of the processor, converting the first format data into second format data, where the second format data includes a luminance value and a chrominance value of the image, coding the second format data into third format data, where a data capacity of the third format data is less than a data capacity of the second format data, and sending the third format data.

According to a fifth aspect, an embodiment of this application discloses a processor. The processor includes a sending unit configured to send to-be-rendered data to a second processor, and an indication unit configured to indicate the second processor to obtain first format data through rendering based on the to-be-rendered data, where the first format data includes a three-primary-color color feature of an image, and the first format data is stored in first storage space of the second processor, indicate the second processor to convert the first format data in the first storage space into second format data, where the second format data includes a luminance value and a chrominance value of the image, and indicate the second processor to code the second format data into third format data, where a data capacity of the third format data is less than a data capacity of the second format data, where the sending unit is further configured to send the third format data to a client.

In a possible implementation, the processor further includes an invoking unit configured to, after the indication unit indicates the second processor to obtain the first format data through rendering based on the to-be-rendered data, before the indication unit indicates the second processor to convert the first format data into the second format data, invoke a first interface to obtain a storage address of the first format data in the first storage space, invoke the first interface to send the storage address to a second interface, and invoke the second interface to indicate the second processor to mark the storage address in a to-be-coded area, where the to-be-coded area includes storage space used to store to-be-coded data and/or a storage address of the to-be-coded data.

In a possible implementation, the first interface is an application programming interface that is configured in a graphics library and that is used to obtain the storage address.

In a possible implementation, the second interface is an application programming interface that is configured in a video acceleration library and that is used to receive the storage address sent by the first interface and indicate the second processor to mark the storage address in the to-be-coded area.

In a possible implementation, the indication unit is further configured to invoke a third interface to apply to the second processor for second storage space, where the second storage space is address space used to store the second format data, and the third interface is an application programming interface in the video acceleration library, and invoke the third interface to indicate the second processor to convert the first format data into the second format data.

In a possible implementation, the indication unit is further configured to invoke a fourth interface to apply to the second processor for third storage space, where the third storage space is address space used to store the third format data, and the fourth interface is an application programming interface in the video acceleration library, and invoke the fourth interface to indicate the second processor to code the second format data into the third format data.

According to a sixth aspect, an embodiment of this application discloses a processor. The processor includes a receiving unit configured to receive to-be-rendered data sent by a first processor, a rendering unit configured to obtain first format data through rendering based on the to-be-rendered data, where the first format data includes a three-primary-color color feature of an image, and the first format data is stored in first storage space of the processor, a conversion unit configured to convert the first format data in the first storage space into second format data, where the second format data includes a luminance value and a chrominance value of the image, a coding unit configured to code the second format data into third format data, where a data capacity of the third format data is less than a data capacity of the second format data, and a sending unit configured to send the third format data.

According to a seventh aspect, an embodiment of this application discloses a server. The server includes a first processor, a second processor, and a storage, the storage stores a computer program, and the first processor is configured to invoke the computer program to perform the method in any one of the first aspect and the possible implementations of the first aspect.

According to an eighth aspect, an embodiment of this application discloses a computer-readable storage medium. The computer-readable storage medium stores a computer program, and when the program is executed by a processor, the method in any one of the first aspect is implemented.

In conclusion, in comparison with the current technology in which data in a first format that is rendered in a second processor needs to be replicated to a memory of a first processor, the data is converted into data in a second format in the first processor, and then the data in the second format is replicated to a memory of the second processor for coding, in the embodiments of this application, a process of performing rendering, format conversion, and coding may be completed in the second processor without requiring additional two times of data transmission. Therefore, in the embodiments of this application, resources of the processor can be reduced, and rendering and coding efficiency can be improved.

BRIEF DESCRIPTION OF DRAWINGS

The following describes the accompanying drawings used in the embodiments of this application.

DESCRIPTION OF EMBODIMENTS

The following describes the embodiments of the present disclosure with reference to the accompanying drawings in the embodiments of the present disclosure.

To facilitate better understanding of an image rendering and coding method and a related apparatus provided in the embodiments of the present disclosure, the following first describes a system architecture involved in the embodiments of the present disclosure. A system architecture shown in FIG. 2 may include a server 201 and a client 202. The server 201 is mainly configured to render and code, according to a request of the client 202, an image or a video required by the client 202, and send an image or a video obtained through rendering and coding to the client 202 for display.

The server 201 may include but is not limited to a background server, a component server, an image rendering and coding server, and the like. A corresponding server-side program such as a program used for data calculation and decision execution needs to run on the server 201 to provide a corresponding image rendering and coding service.

The client 202 may include a handheld device (for example, a mobile phone, a tablet computer, or a palmtop computer), a vehicle-mounted device, a wearable device (for example, a smart watch, a smart band, or a pedometer), a smart household device (for example, a refrigerator, a television, an air conditioner, or a meter), a smart robot, a workshop device, and various forms of user equipment (UE), a mobile station (MS), a terminal device (terminal equipment), and the like.

Figure 1:
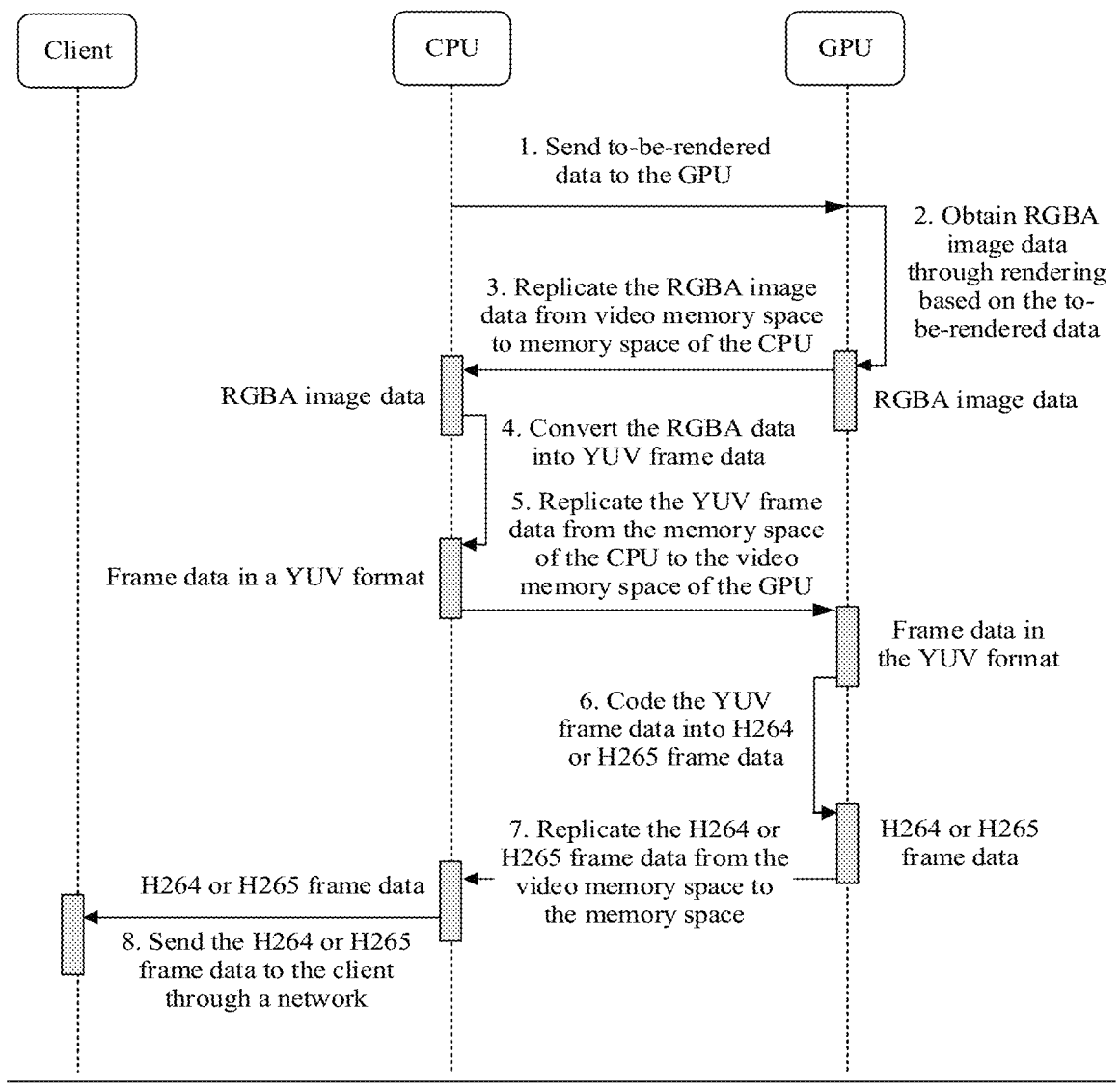
FIG. 1 is a schematic interaction diagram of a rendering and coding method in a current technology.
Figure 2:
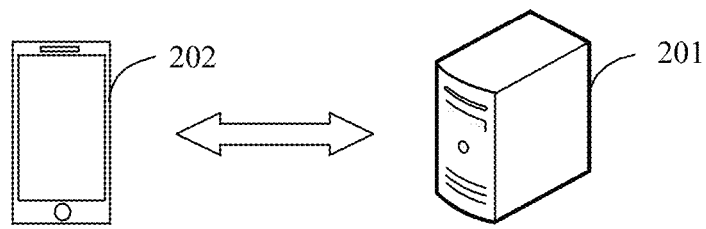
FIG. 2 is a schematic diagram of a system architecture according to an embodiment of the present disclosure.

It should be noted that the system architecture involved in the image rendering and coding method provided in the embodiments of this application is not limited to the system architecture shown in FIG. 2.

Figure 3:
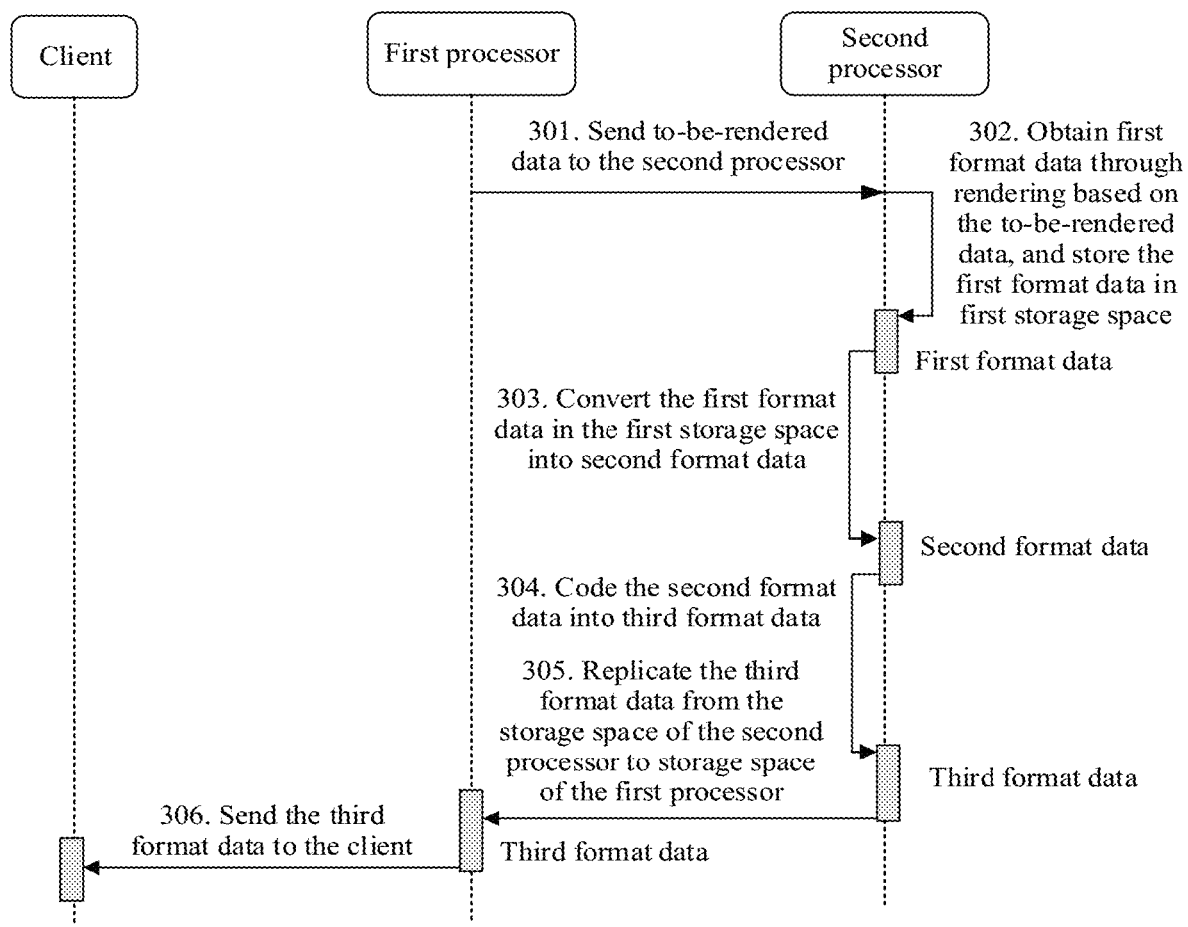
FIG. 3 is a schematic interaction diagram of a rendering and coding method according to an embodiment of the present disclosure.

FIG. 3 shows an image rendering and coding method according to an embodiment of the present disclosure. The method includes but is not limited to the following steps.

Step 301: A first processor sends to-be-rendered data to a second processor.

Step 302: The second processor obtains first format data through rendering based on the to-be-rendered data, and stores the first format data in first storage space.

Optionally, the first processor may be a CPU, a microprocessor with a non-interlocking pipeline phase architecture, an advanced reduced instruction set machine, an FPGA, or the like. The second processor may be a GPU or another apparatus or device that can accelerate graphics processing, for example, an artificial intelligence accelerator card.

In a specific embodiment, the first processor sends the to-be-rendered data to the second processor. After the second processor receives the to-be-rendered data, the first processor indicates the second processor to obtain the first format data through rendering based on the to-be-rendered data and to store the first format data in the first storage space of the second processor.

Optionally, the to-be-rendered data includes location information, texture information, and the like of a mark point of an image. For example, the location information of the mark point may be coordinate information of four vertices of a rectangle in an image that needs to be obtained through rendering. The texture information may include information about a color filled in the image that needs to be obtained through rendering, in other words, includes color layout information in the image that needs to be obtained through rendering, and the like.

In a possible implementation, the first processor may indicate, by invoking an application programming interface that is in a graphics library and that is used for data rendering, the second processor to perform rendering based on the to-be-rendered data.

Optionally, the graphics library may be an open graphics library (OpenGL) or the like. Optionally, the OpenGL may be implemented by using Mesa3D. The Mesa3D is a three-dimensional (3D) computer graphics library for opening source code under a license of the Massachusetts Institute of Technology (MIT), and may implement an application programming interface of the OpenGL in an open source form.

In a possible implementation, the first format data may include a three-primary-color color feature of an image.

Optionally, the first format data may be image data in an RGBA format. The alpha channel may be used as an opacity parameter. If a value of an alpha channel of a pixel is 0%, the pixel is entirely transparent (or invisible). If the value is 100%, it means that the pixel is an entirely opaque pixel (a conventional digital image). A value between 0% and 100% allows a pixel to be displayed through the background, as through glass (translucency). This effect cannot be achieved with simple binary transparency (transparent or opaque). The alpha channel makes image compositing easy. The value of the alpha channel may be represented by a percentage or an integer, or may be represented by a real number from 0 to 1 as an RGB parameter.

In a possible implementation, the first storage space may be storage space that is used to store the first format data and for which the first processor applies to the second processor by invoking an application programming interface that is in the graphics library and that is used to apply for storage space.

Optionally, if the second processor is a GPU, the first storage space may be video memory space used to store the first format data.

Optionally, the first processor in this solution may be a processor in a server (including a cloud server), or may be a processor of a device that can complete rendering and coding operations and interact with a client. A device in which the first processor is located is not limited in this solution, and any device capable of implementing a function of this solution is a device protected in this solution. Similarly, a device in which the second processor is located is not limited in this solution, and any device that can implement a function of this solution is a device protected in this solution.

Step 303: The second processor converts the first format data in the first storage space into second format data.

In a specific embodiment, the first processor may indicate the second processor to convert the first format data into the second format data.

In a possible implementation, the first processor may indicate, by invoking an application programming interface that is in a video acceleration library and that is used for format conversion, the second processor to convert the first format data. The video acceleration library may be used to provide video hardware coding and decoding functions, and may also be used to convert the first format data into the second format data.

Optionally, the video acceleration library may include a video acceleration application programming interface (VAAPI) and the like.

Optionally, the VAAPI may be implemented by using Mesa3D, and the Mesa3D may implement an application programming interface of video acceleration (VA) in an open source form.

In a possible implementation, the second format data may include a luminance value and a chrominance value of the image.

Optionally, the second format data may be frame data in a YUV format. YUV is a color coding method, and is often used in each video processing component. When coding a photo or a video, YUV takes a human perception capability into account and allows reduced chrominance bandwidth. YUV is a format used to compile image data. Proper nouns such as Y'UV, YUV, YCbCr, and YPbPr may be referred to as YUV and overlap each other. "Y" represents luminance (Luminance or Luma), namely, a grayscale value, and "U" and "V" represent chrominance (Chrominance or Chroma), and are used to describe a color and saturation of an image and used to specify a color of a pixel.

In a possible implementation, the graphics library includes an application programming interface (which may be referred to as a first interface) configured to obtain a storage resource of the first format data. The first processor may directly invoke the first interface to obtain the storage resource of the first format data. The storage resource may include storage address information of the first format data, namely, specific address information of the first storage space, and may further include information such as a capacity size of the first format data.

Optionally, if the second processor is a GPU, the storage resource may be a video memory resource. The video memory resource may include storage address information of video memory space in which the first format data is located, and may further include information such as a capacity size of the first format data.

In addition, the video acceleration library includes an application programming interface (which may be referred to as a second interface) configured to receive the storage resource that the first processor invokes the first interface to send. In other words, after obtaining the storage resource of the first format data, the first interface sends the storage resource to the second interface. After obtaining the storage resource, the second interface may indicate the second processor to mark the storage resource in a to-be-coded area such as a coding buffer, to wait for format conversion to perform coding. The to-be-coded area includes storage space used to store to-be-coded data and/or a storage address of the to-be-coded data.

In a possible implementation, the first interface may be a newly added application programming interface in a graphics library that cannot implement a function of obtaining the storage resource of the first format data and sending the storage resource to the second interface, and the interface is exclusively used to obtain the storage resource of the first format data, and send the storage resource to the second interface. In addition, the second interface may be a newly added application programming interface in a video acceleration library that cannot implement a function of receiving the storage resource from the first interface and marking the storage resource in the to-be-coded area, and the interface is exclusively used to receive the storage resource from the first interface, and mark the storage resource in the to-be-coded area.

In a possible implementation, a computer program may be added to an OpenGL state tracker of the Mesa3D to implement the first interface, and the OpenGL state tracker manages a storage resource of image data. In addition, a computer program may be added to a VA state tracker of the Mesa3D to implement the second interface. The VA state tracker manages a storage resource of a coding buffer, and the coding buffer is used to manage input data and output data of image/video coding.

In a possible implementation, the first processor may invoke a third interface to apply to the second processor for second storage space, where the second storage space is address space used to store the second format data, and then invoke the third interface to indicate the second processor to convert the first format data into the second format data.

Optionally, the third interface may be an application programming interface in the video acceleration library. Further, the third interface may be a format conversion interface, and the interface is used to convert the first format data into the second format data.

In a specific embodiment, after invoking the third interface to obtain the storage resource of the first format data by using the second interface, the first processor applies to the second processor for storage space used to store data obtained after format conversion of the first format data, namely, the second format data, then invokes the third interface to obtain the first format data based on the storage resource, and then indicates the second processor to convert the image data into the second format data and store the second format data in the storage space obtained through the application.

Optionally, if the second processor is a GPU, the second storage space may be video memory space used to store the second format data.

In this embodiment of this application, rendered image data may be obtained by using a dedicated application programming interface, so that format conversion can be performed on the image data on a second processor side, thereby avoiding operations of replicating rendered data to the first processor for format conversion and then replicating data obtained through format conversion to the second processor, and reducing resources of the first processor and the second processor.

Step 304: The second processor codes the second format data into third format data.

In a specific embodiment, after indicating the second processor to convert the first format data into the second format data, the first processor continues to indicate the second processor to code the second format data into the third format data.

In a possible implementation, a data capacity of the third format data is less than a data capacity of the second format data. Therefore, bandwidth occupied by the third format data in a transmission process is less than bandwidth occupied by the second format data in a transmission process.

Optionally, the third format data may be frame data in an H.264 or H.265 format. H.264 is a highly compressed digital video codec standard. Main parts of the H.264 standard include an access unit delimiter, supplemental enhancement information (SEI), a primary coded picture, and a redundant coded picture, and may further include instantaneous decoding refresh (IDR), a Hypothetical Reference Decoder (HRD), and a hypothetical stream scheduler (HSS). In addition, H.265 is High Efficiency Video Coding (HEVC), and is a new video coding standard developed after H.264.

In a possible implementation, the first processor invokes a fourth interface to apply to the second processor for third storage space, where the third storage space is address space used to store the third format data, and then invokes the fourth interface to indicate the second processor to code the second format data into the third format data.

Optionally, the fourth interface may be an application programming interface in the video acceleration library. Further, the fourth interface may be a coding interface, and the interface is used to code the second format data into the third format data.

In a specific embodiment, after the third interface converts the first format data into the second format data, the first processor invokes the fourth interface to apply to the second processor for storage space used to store data obtained after coding of the second format data, namely, the third format data, and then invokes the fourth interface to indicate the second processor to code the second format data to obtain the third format data and store the third format data in the storage space obtained through the application.

Optionally, if the second processor is a GPU, the third storage space may be video memory space used to store the third format data.

Step 305: The second processor replicates the third format data from the storage space corresponding to the second processor to storage space corresponding to the first processor.

Further, the first processor may indicate the second processor to replicate the third format data from the storage space corresponding to the second processor to the storage space corresponding to the first processor, in other words, the first processor may indicate the second processor to send the third format data from the storage space corresponding to the second processor to the storage space corresponding to the first processor.

Optionally, if the first processor is a CPU, the storage space corresponding to the first processor may be memory space. Further, a memory is a storage of the CPU, is used to store a program and data existing when a process runs, and is also referred to as an executable storage. The memory space may be address space that is allocated by the CPU in the memory and that is used to store the third format data.

Step 306: The first processor sends the third format data to the client.

In a specific embodiment, the first processor indicates the second processor to replicate the third format data obtained through coding from the storage space of the second processor to the storage space of the first processor, and then the first processor sends the third format data to the corresponding client for display.

In a possible implementation, this solution may be implemented based on a layer, namely, a state tracker, of an open source driver Mesa3D of the second processor without depending on a device-related drive layer of the second processor, that is, without depending on a specific second processor model. Any second processor that implements the OpenGL interface and the VAAPI interface based on the open source driver Mesa3D can use this solution.

In a possible implementation, the open source driver Mesa3D of the second processor may be implemented based on a LINUX system, or certainly may be implemented based on another system such as Berkeley Software Distribution (BSD), where the BSD is a derived system of UNIX. A system or a platform used for the implementation is not limited in this solution, provided that the system or the platform can implement a function of this solution.

In a possible implementation, the first interface may be alternatively an application programming interface independent of the graphics library, and the application programming interface can also implement a function that can be implemented by the first interface, that is, obtaining the storage resource of the first format data, and sending the storage resource to the second interface.

In a possible implementation, the second interface may be alternatively an application programming interface independent of the video acceleration library, and the second interface may exchange data with an application programming interface in the graphics library, and therefore can also implement a function that can be implemented by the second interface, that is, receiving the storage resource from the first interface, sending the storage resource to the video acceleration library, and then marking the storage resource in the coding buffer.

In a possible implementation, the operations described in step 301 to step 306 may be operations implemented by the first processor by executing a main program. Further, the first processor downloads the main program to memory space, and then runs the main program, to implement the operations described in step 301 to step 306.

In conclusion, in a current technology, a rendering result, namely, image data in an RGBA format, is transmitted back to a first processor side, a first processor performs transcoding from the RGBA format to a YUV format, and then sends data in the YUV format to a second processor, and the second processor performs transcoding of the YUV data to H.264 or H265 data, and transmits H.264 or H265 data back to the first processor. The entire procedure has a relatively large quantity of steps, a quite long processing time, and needs to take approximately 80 ms to complete on average. In the present disclosure, after a frame of image is rendered, a procedure of directly converting a rendered image from an RGBA format to a YUV format and performing coding from the YUV format to H264 or H265 format is directly completed in a second processor. There are a few procedures, a required processing time is short, and it takes approximately 8 milliseconds (ms) to complete the procedure on average, performance is improved by 10 times compared with that in the current technology, and a delay is low. A client can receive an image update more quickly, so that the image update is smoother.

In addition, in the current technology, for performing additional two times of data replication between storage space of the first processor and storage space of the second processor, when a plurality of cloud mobile phones is concurrent, it needs to consume relatively large load of the first processor and the second processor to perform data migration, limiting concurrent density of cloud mobile phones. In the solution of the present disclosure, the two times of data replication are reduced, resources of the first processor and the second processor are reduced, and concurrent density of cloud mobile phones is increased.

In addition, in the current technology, the first processor needs to perform conversion from the RGBA format to the YUV format, and consequently, resources of the first processor are consumed. In the solution of the present disclosure, the second processor performs the conversion, so that resources of the first processor are reduced. In addition, the second processor performs such conversion more quickly and efficiently than the first processor.

Figure 4:
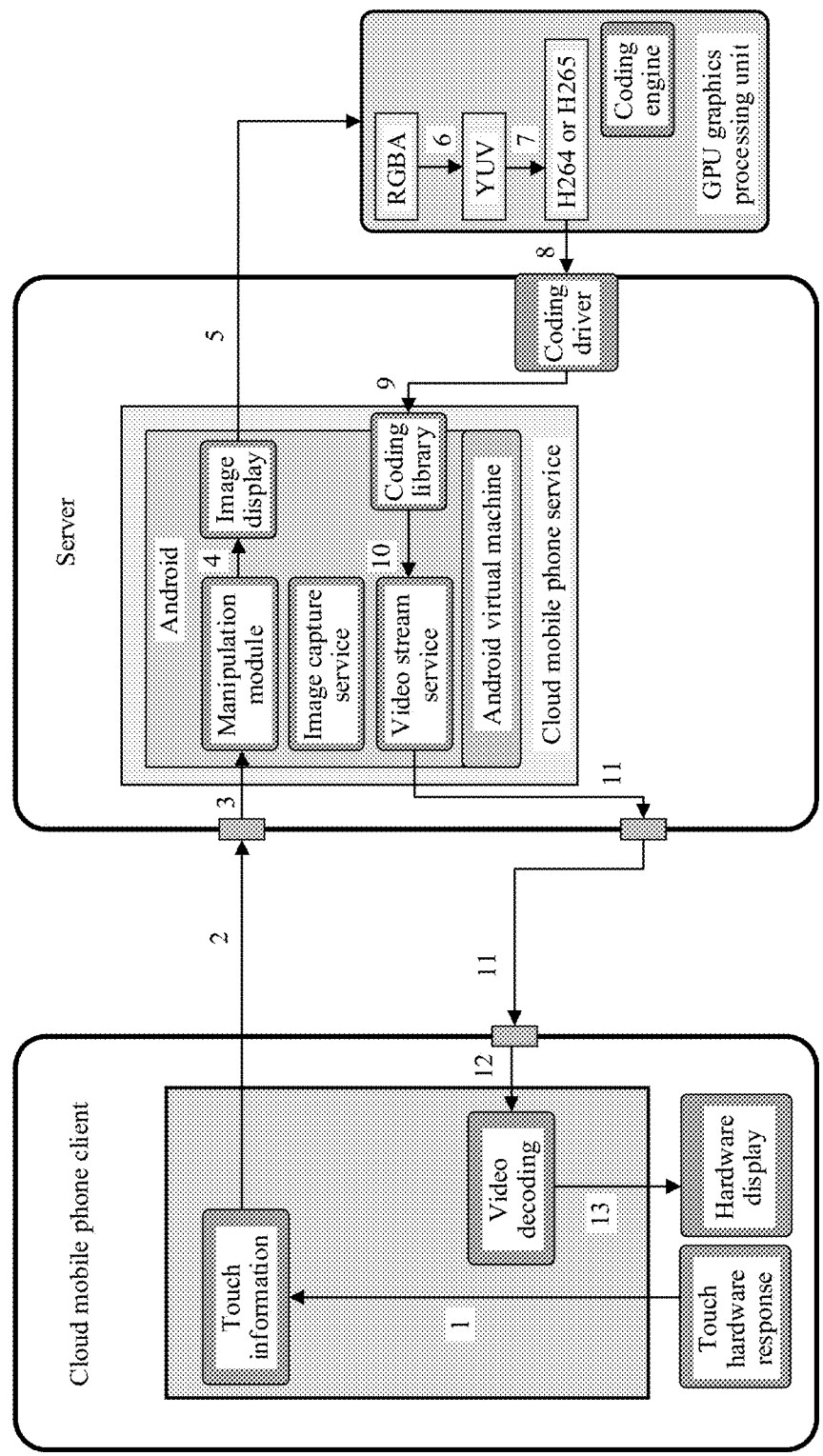
FIG. 4 is a schematic diagram of a scenario of interaction between a client and a server according to an embodiment of the present disclosure.

To facilitate understanding of this solution, the following describes an application embodiment of an image rendering and coding method provided in an embodiment of this solution with reference to a diagram of a scenario of interaction between a client and a server illustrated in FIG. 4.

The scenario shown in FIG. 4 includes a cloud mobile phone client and a server side. A cloud mobile phone server runs on a server, and the cloud mobile phone service may be an ANDROID virtual machine. The cloud mobile phone service may include a manipulation module, an image capture service module, and a video stream service module. The cloud mobile phone service may further include an image display module and a coding library. The server may further include a GPU. Certainly, the GPU may be independent of the server but may exchange data with the server.

With reference to FIG. 4, the following describes, by using an example, an application procedure of an image rendering and coding method provided in an embodiment of this solution. The procedure may include but is not limited to the following steps:

1. The cloud mobile phone client obtains touch information in response to a touch operation of hardware, where the touch information may include touch location information, information that is obtained through matching based on touch and that indicates that displayed image data needs to be obtained, and the like.

2. Then the cloud mobile phone client sends the touch information to the server through a network.

3. After receiving the touch information, the server triggers the manipulation module of the cloud mobile phone service to process the touch information to obtain processed data.

4 and 5. The server triggers the image display module of the cloud mobile phone service to request the GPU to render the processed data to obtain rendered image data in an RGBA format.

6. Then the GPU continues to convert the rendered image data in the RGBA format into frame data in a YUV format.

7. After the format conversion, the GPU continues to code converted frame data in the YUV format into data in an H.264 or H.265 format.

8, 9, and 10. The GPU transmits the H.264 or H.265 frame data obtained through coding back to the video stream service module of the cloud mobile phone service.

11. The video stream service module of the cloud mobile phone service sends the H.264 or H.265 frame data to the cloud mobile phone client through the network.

12. After receiving the H.264 or H.265 frame data, the cloud mobile phone client performs video decoding on the H.264 or H.265 frame data.

13. The cloud mobile phone client displays decoded data on a screen.

For specific implementation and beneficial effects of the steps 4, 5, 6, and 7, refer to corresponding descriptions in FIG. 3. Details are not described herein again.

The solution provided in the embodiments of this application is mainly described above from a perspective of interaction between the first processor and the second processor. It may be understood that to achieve the foregoing functions, each network element such as the first processor or the second processor includes a corresponding hardware structure and/or software module for performing each function. A person skilled in the art should easily be aware that, in combination with units and algorithm steps of the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the first processor, the second processor, and the like may be divided into function modules based on the foregoing method examples. For example, each function module may be obtained through division based on a corresponding function, or two or more functions may be integrated into one processing module. The integrated module may be implemented in a form of hardware, or may be implemented in a form of a software function module. It should be noted that, in the embodiments of this application, module division is an example, and is merely logical function division. In actual implementation, another division manner may be used.

Figure 5:
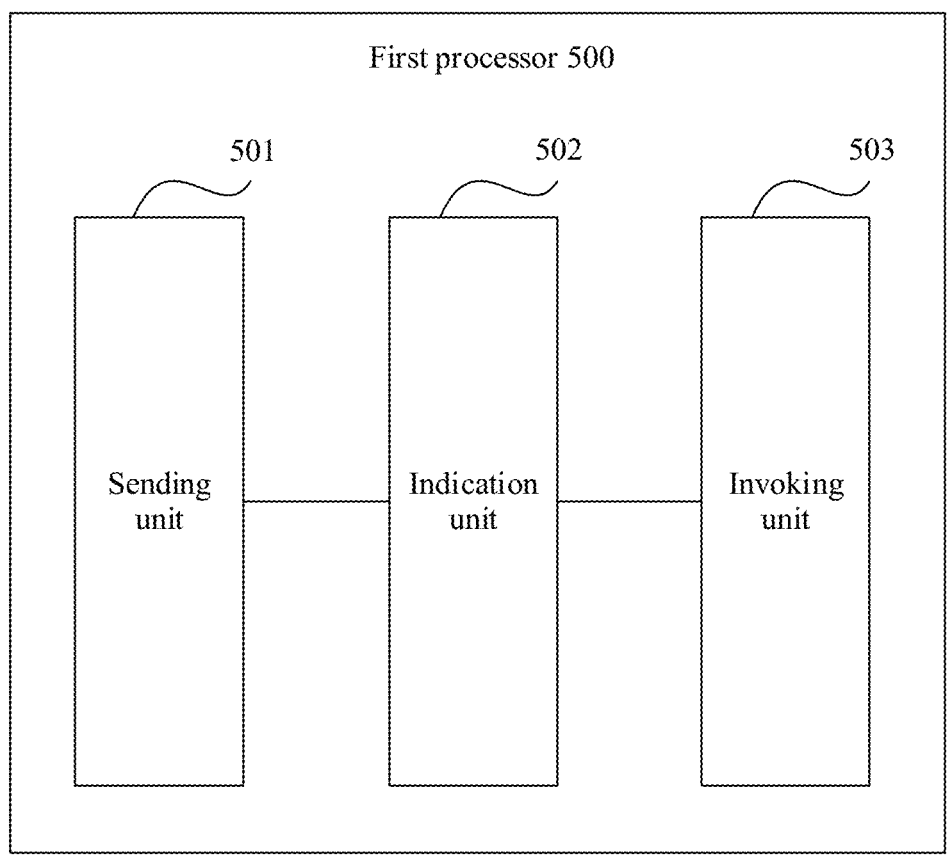
FIG. 5 is a schematic diagram of a structure of a processor according to an embodiment of the present disclosure.

When each function module is obtained through division based on each corresponding function, FIG. 5 is a possible schematic diagram of a logical structure of the first processor in the foregoing method embodiment. A first processor 500 includes a sending unit 501, an indication unit 502, and an invoking unit 503. For example, the sending unit 501 is configured to perform the steps of sending information by the first processor shown in step 301 and step 306 in the foregoing method embodiment shown in FIG. 3, the indication unit 502 is configured to perform the steps of indicating, by the first processor, the second processor to complete image rendering, format conversion, coding, and replication shown in step 302, step 303, step 304, and step 305 in the foregoing method embodiment shown in FIG. 3, and the invoking unit 503 is configured to perform the steps of invoking an interface by the first processor shown in possible implementations of step 302, step 303, and step 304 in the foregoing method embodiment shown in FIG. 3.

For example, the sending unit 501 is configured to send to-be-rendered data to a second processor, the indication unit 502 is configured to indicate the second processor to obtain first format data through rendering based on the to-be-rendered data, where the first format data includes a three-primary-color color feature of an image, and the first format data is stored in first storage space of the second processor, indicate the second processor to convert the first format data in the first storage space into second format data, where the second format data includes a luminance value and a chrominance value of the image, and indicate the second processor to code the second format data into third format data, where a data capacity of the third format data is less than a data capacity of the second format data, and the sending unit 501 is further configured to send the third format data to a client.

Figure 6:
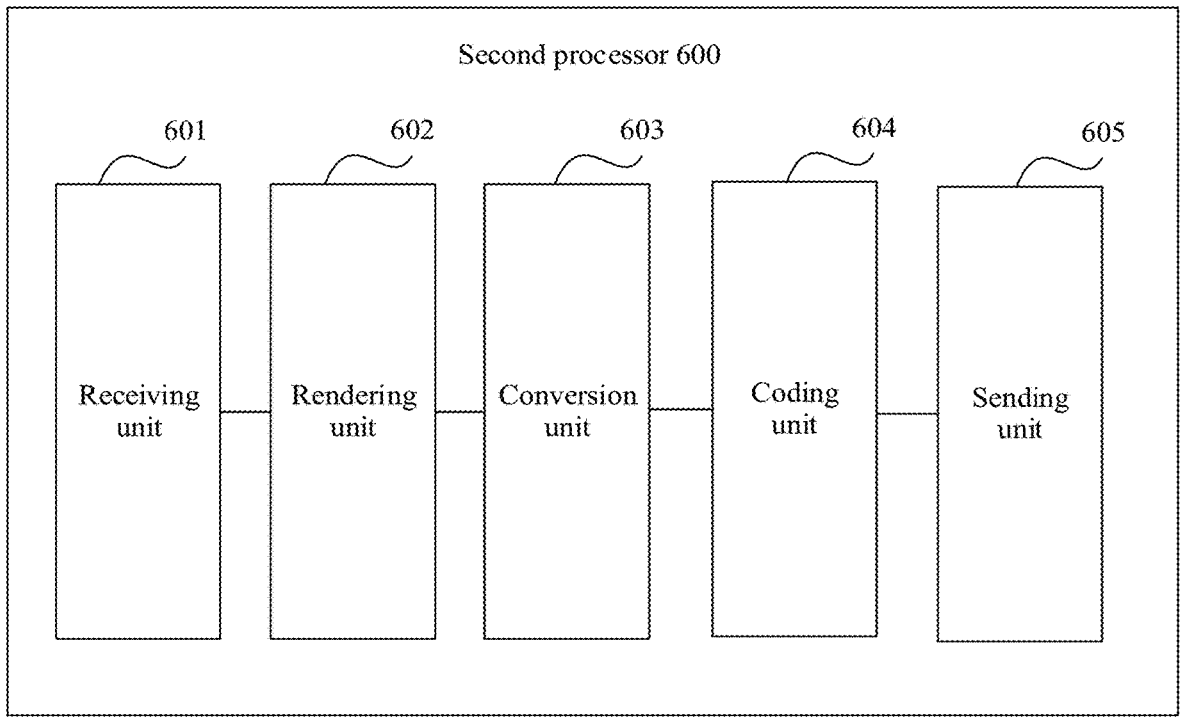
FIG. 6 is a schematic diagram of a structure of another processor according to an embodiment of the present disclosure.

When each function module is obtained through division based on each corresponding function, FIG. 6 is a possible schematic diagram of a logical structure of the second processor in the foregoing method embodiment. A second processor 600 includes a receiving unit 601, a rendering unit 602, a conversion unit 603, a coding unit 604, and a sending unit 605. For example, the receiving unit 601 is configured to perform the step of receiving information by the second processor shown in step 302 in the foregoing method embodiment shown in FIG. 3, the rendering unit 602 is configured to perform the step of rendering an image by the second processor shown in step 302 in the foregoing method embodiment shown in FIG. 3, the conversion unit 603 is configured to perform the step of converting a format by the second processor shown in step 303 in the foregoing method embodiment shown in FIG. 3, the coding unit 604 is configured to perform the coding step of the second processor shown in step 304 in the foregoing method embodiment shown in FIG. 3, and the sending unit 605 is configured to perform the step of sending information by the second processor shown in step 305 in the foregoing method embodiment shown in FIG. 3.

For example, the receiving unit 601 is configured to receive to-be-rendered data sent by a first processor, the rendering unit 602 is configured to obtain first format data through rendering based on the to-be-rendered data, where the first format data includes a three-primary-color color feature of an image, and the first format data is stored in first storage space of the processor, the conversion unit 603 is configured to convert the first format data in the first storage space into second format data, where the second format data includes a luminance value and a chrominance value of the image, the coding unit 604 is configured to code the second format data into third format data, where a data capacity of the third format data is less than a data capacity of the second format data, and the sending unit 605 is configured to send the third format data.

To better implement the foregoing solution of the present disclosure, an embodiment of the present disclosure further correspondingly provides a processor. The processor may be the first processor in FIG. 3, and the processor performs the following operations sending to-be-rendered data to a second processor, indicating the second processor to obtain first format data through rendering based on the to-be-rendered data, where the first format data includes a three-primary-color color feature of an image, and the first format data is stored in first storage space of the second processor, indicating the second processor to convert the first format data into second format data, where the second format data includes a luminance value and a chrominance value of the image, indicating the second processor to code the second format data into third format data, where a data capacity of the third format data is less than a data capacity of the second format data, and sending the third format data to a client.

In a possible implementation, after the processor indicates the second processor to obtain the first format data through rendering based on the to-be-rendered data, before the processor indicates the second processor to convert the first format data into the second format data, the processor invokes a first interface to obtain a storage address of the first format data in the first storage space, the processor invokes the first interface to send the storage address to a second interface, and the processor invokes the second interface to indicate the second processor to mark the storage address in a to-be-coded area, where the to-be-coded area includes storage space used to store to-be-coded data and/or a storage address of the to-be-coded data.

In a possible implementation, the first interface is an application programming interface that is configured in a graphics library and that is used to obtain the storage address.

In a possible implementation, the second interface is an application programming interface that is configured in a video acceleration library and that is used to receive the storage address sent by the first interface and indicate the second processor to mark the storage address in the to-be-coded area.

In a possible implementation, that the processor indicates the second processor to convert the first format data into second format data includes the processor invokes a third interface to apply to the second processor for second storage space, where the second storage space is address space used to store the second format data, and the third interface is an application programming interface in the video acceleration library, and the processor invokes the third interface to indicate the second processor to convert the first format data into the second format data.

In a possible implementation, that the processor indicates the second processor to code the second format data into third format data includes the processor invokes a fourth interface to apply to the second processor for third storage space, where the third storage space is address space used to store the third format data, and the fourth interface is an application programming interface in the video acceleration library, and the processor invokes the fourth interface to indicate the second processor to code the second format data into the third format data.

An embodiment of the present disclosure further correspondingly provides a processor. The processor may be the second processor in FIG. 3, and the processor performs the following operations receiving to-be-rendered data, obtaining first format data through rendering based on the to-be-rendered data, where the first format data includes a three-primary-color color feature of an image, and the first format data is stored in first storage space of the processor, converting the first format data into second format data, where the second format data includes a luminance value and a chrominance value of the image, coding the second format data into third format data, where a data capacity of the third format data is less than a data capacity of the second format data, and sending the third format data.

Figure 7:
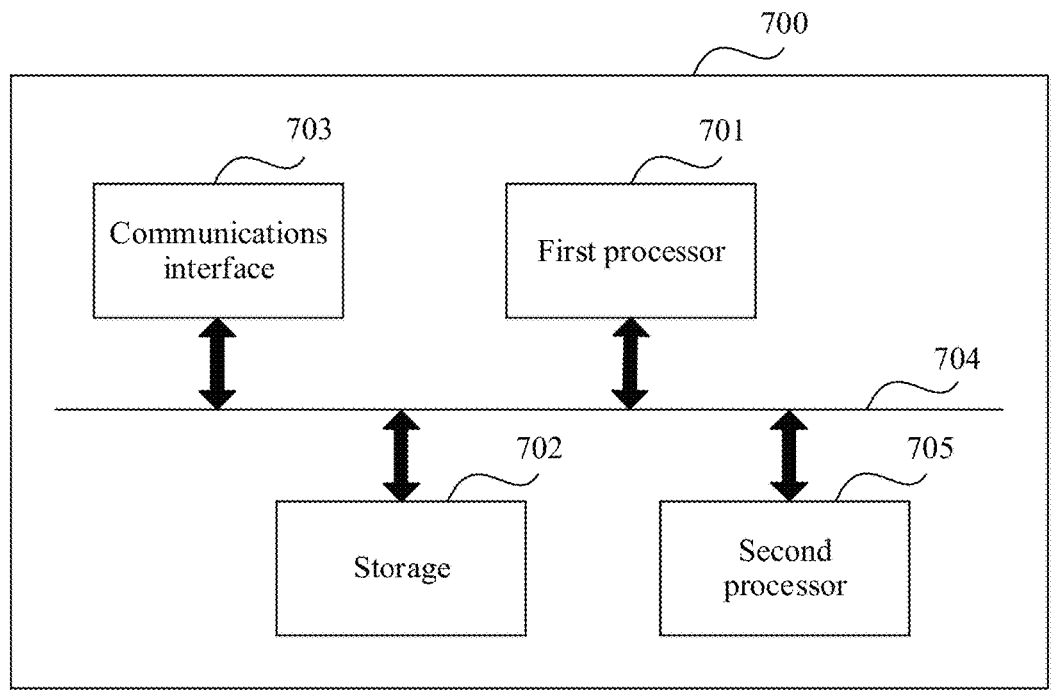
FIG. 7 is a schematic diagram of a structure of a server according to an embodiment of the present disclosure.

An embodiment of the present disclosure further correspondingly provides a server, as shown in FIG. 7. FIG. 7 shows a server 700 according to an embodiment of the present disclosure. The server 700 includes a first processor 701 (which may be the first processor in FIG. 3), a storage 702, a communications interface 703, and a second processor 705 (which may be the second processor in FIG. 3). The first processor 701, the storage 702, the communications interface 703, and the second processor 705 are connected to each other by using a bus 704.

The storage 702 includes but is not limited to a random-access memory (RAM), a read-only memory (ROM), an erasable programmable ROM (EPROM), or a compact disc (CD) ROM (or CD-ROM). The storage 702 is configured to store a related program and related data. The communications interface 703 is configured to receive and send data.

The first processor 701 in the server 700 is configured to read a computer program stored in the storage 702, to execute the foregoing method embodiment in FIG. 3 and the possible implementations of FIG. 3.

An embodiment of the present disclosure further provides a computer-readable storage medium. The computer-readable storage medium stores a computer program, and the computer program is executed by a processor to implement the foregoing method embodiment in FIG. 3 and the possible implementations of FIG. 3.

An embodiment of the present disclosure further provides a computer program product. When the computer program product is read and executed by a computer, the foregoing method embodiment in FIG. 3 and the possible implementations of FIG. 3 is implemented.

An embodiment of the present disclosure further provides a computer program. When the computer program is executed on a computer, the computer is enabled to implement the foregoing method embodiment in FIG. 3 and the possible implementations of FIG. 3.

In conclusion, in comparison with the current technology in which data in a first format that is rendered in a second processor needs to be replicated to a memory of a first processor, the data is converted into data in a second format in the first processor, and then the data in the second format is replicated to a memory of the second processor for coding, in the embodiments of this application, a process of performing rendering, format conversion, and coding may be completed in the second processor without requiring additional two times of data transmission. Therefore, in the embodiments of this application, resources of the first processor and the second processor can be reduced, and rendering and coding efficiency can be improved.

In conclusion, the foregoing descriptions are merely example embodiments of the present disclosure, but are not intended to limit the protection scope of the present disclosure. Any modification, equivalent replacement, or improvement made without departing from the principle of the present disclosure shall fall within the protection scope of the present disclosure.

What is claimed is:

1. An image rendering and coding method implemented by a first processor, wherein the image rendering and coding method comprises:
    sending to-be-rendered data to a second processor;
    instructing the second processor to obtain first format data through rendering based on the to-be-rendered data, wherein the first format data comprises a three-primary-color color feature of an image, and wherein the first format data is in a first storage space of the second processor;
    instructing the second processor to convert the first format data into second format data, wherein the second format data comprises a luminance value of the image and a chrominance value of the image;
    instructing the second processor to code the second format data into third format data, wherein a first data capacity of the third format data is less than a second data capacity of the second format data;
    receiving the third format data from the second processor; and
    sending the third format data to a client.

2. The image rendering and coding method of claim 1, wherein after instructing the second processor to obtain the first format data and before instructing the second processor to convert the first format data into the second format data, the image rendering and coding method further comprises:
invoking a first interface to obtain a first storage address of the first format data in the first storage space;
invoking the first interface to send the first storage address to a second interface; and
invoking the second interface to instruct the second processor to mark the first storage address in a to-be-coded area,
wherein the to-be-coded area comprises a storage space for storing to-be-coded data or a second storage address of the to-be-coded data.

3. The image rendering and coding method of claim 2, wherein the first interface is an application programming interface (API) configured in a graphics library and is configured to obtain the first storage address.

4. The image rendering and coding method of claim 2, wherein the second interface is an application programming interface (API) configured in a video acceleration library and is configured to:
receive the first storage address from the first interface; and
instruct the second processor to mark the first storage address in the to-be-coded area.

5. The image rendering and coding method of claim 1, further comprising:
invoking a third interface to apply to the second processor for a second storage space, wherein the second storage space is an address space for storing the second format data, and wherein the third interface is an application programming interface (API) in a video acceleration library; and
invoking the third interface to instruct the second processor to convert the first format data into the second format data.

6. The image rendering and coding method of claim 1, further comprising:
invoking a fourth interface to apply to the second processor for a third storage space, wherein the third storage space is an address space for storing the third format data, and wherein the fourth interface is an application programming interface (API) in a video acceleration library; and
invoking the fourth interface to instruct the second processor to code the second format data into the third format data.

7. A central processor comprising:
a transmitter configured to:
send to-be-rendered data to a second processor; and
send third format data to a client; and
a first processor coupled to the transmitter and configured to:
instruct the second processor to obtain first format data through rendering based on the to-be-rendered data, wherein the first format data comprises a three-primary-color color feature of an image, and wherein the first format data is in first storage space of the second processor;
instruct the second processor to convert the first format data in the first storage space into second format data, wherein the second format data comprises a luminance value of the image and a chrominance value of the image; and
instruct the second processor to code the second format data into the third format data,
wherein a first data capacity of the third format data is less than a second data capacity of the second format data, and
wherein the transmitter is further configured to send the third format data to a client.

8. The central processor of claim 7, wherein the first processor is further configured to:
invoke a first interface to obtain a first storage address of the first format data in the first storage space after instructing the second processor to obtain the first format data and before instructing the second processor to convert the first format data into the second format data;
invoke the first interface to send the first storage address to a second interface; and
invoke the second interface to instruct the second processor to mark the first storage address in a to-be-coded area,
wherein the to-be-coded area comprises a storage space for storing to-be-coded data or a second storage address of the to-be-coded data.

9. The central processor of claim 8, wherein the first interface is an application programming interface (API) configured in a graphics library and is configured to obtain the first storage address.

10. The central processor of claim 8, wherein the second interface is an application programming interface (API) configured in a video acceleration library and is configured to receive the first storage address from the first interface and instruct the second processor to mark the first storage address in the to-be-coded area.

11. The central processor of claim 7, wherein the first processor is further configured to:
invoke a third interface to apply to the second processor for a second storage space, wherein the second storage space is an address space for storing the second format data, and wherein the third interface is an application programming interface (API) in a video acceleration library; and
invoke the third interface to instruct the second processor to convert the first format data into the second format data.

12. The central processor of claim 7, wherein the first processor is further configured to:
invoke a fourth interface to apply to the second processor for a third storage space, wherein the third storage space is an address space for storing the third format data, and wherein the fourth interface is an application programming interface (API) in a video acceleration library; and
invoke the fourth interface to instruct the second processor to code the second format data into the third format data.

13. A server comprising:
a storage configured to store a computer program;
a second processor coupled to the storage; and
a first processor coupled to the storage and the second processor, wherein when executed by the first processor, the computer program causes the first processor to:
send to-be-rendered data to the second processor;
instruct the second processor to obtain first format data through rendering based on the to-be-rendered data, wherein the first format data comprises a three-primary-color color feature of an image, and wherein the first format data is in a first storage space of the second processor;

instruct the second processor to convert the first format data into second format data, wherein the second format data comprises a luminance value of the image and a chrominance value of the image;

instruct the second processor to code the second format data into third format data, wherein a first data capacity of the third format data is less than a second data capacity of the second format data;

receive the third format data from the second processor; and send the third format data to a client.

14. The server of claim 13, wherein when executed by the first processor, the computer program causes the first processor to:

invoke a first interface to obtain a first storage address of the first format data in the first storage space;

invoke the first interface to send the first storage address to a second interface; and invoke the second interface to instruct the second processor to mark the first storage address in a to-be-coded area, wherein the to-be-coded area comprises a storage space for storing to-be-coded data or a second storage address of the to-be-coded data.

15. The server of claim 13, wherein the first interface is an application programming interface (API) configured in a graphics library and is configured to obtain the first storage address.

16. The server of claim 13, wherein the second interface is an application programming interface (API) configured in a video acceleration library and is configured to receive the first storage address from the first interface and instruct the second processor to mark the first storage address in the to-be-coded area.

17. The server of claim 13, wherein when executed by the first processor, the computer program further causes the first processor to:

invoke a third interface to apply to the second processor for a second storage space, wherein the second storage space is an address space for storing the second format data, and wherein the third interface is an application programming interface (API) in a video acceleration library; and invoke the third interface to instruct the second processor to convert the first format data into the second format data.

18. The server of claim 13, wherein when executed by the first processor, the computer program further causes the first processor to:

invoke a fourth interface to apply to the second processor for a third storage space, wherein the third storage space is an address space for storing the third format data, and wherein the fourth interface is an application programming interface (API) in a video acceleration library; and invoke the fourth interface to instruct the second processor to code the second format data into the third format data.

19. The server of claim 13, wherein when executed by the first processor, the computer program further causes the first processor to:

invoke a fourth interface to apply to the second processor for a third storage space, wherein the third storage space is an address space for storing the third format data, and wherein the fourth interface is an application programming interface (API) in a video acceleration library; and invoke the fourth interface to instruct the second processor to code the second format data into the third format data.

* * * * *